United States Patent
Sasaki et al.

[11] Patent Number: 6,038,006
[45] Date of Patent: Mar. 14, 2000

[54] LIQUID CRYSTAL DISPLAY DEVICE WITH LIGHT SHIELD AND COLOR FILTER OVERLAPPING TWO EDGES OF PIXEL ELECTRODE

[75] Inventors: Kazuhiro Sasaki, Sagamihara; Shinichi Shimomaki, Akishima; Norihiro Arai, Hino, all of Japan

[73] Assignee: Casio Computer Co., Ltd., Tokyo, Japan

[21] Appl. No.: 08/919,031

[22] Filed: Aug. 27, 1997

[30] Foreign Application Priority Data

| Sep. 2, 1996 | [JP] | Japan | ................................... 8-248474 |
| Dec. 25, 1996 | [JP] | Japan | ................................... 8-355901 |
| Dec. 25, 1996 | [JP] | Japan | ................................... 8-355902 |

[51] Int. Cl.⁷ ....................... G02F 1/1335; G02F 1/1333; G02F 1/1339
[52] U.S. Cl. ......................... 349/106; 349/110; 349/155
[58] Field of Search .................... 349/110, 106, 349/155

[56] References Cited

U.S. PATENT DOCUMENTS

| 4,448,491 | 5/1984 | Okubo | 349/110 |
| 4,568,149 | 2/1986 | Sugata et al. | 349/106 |
| 4,767,723 | 8/1988 | Hinsberg, III et al. | 438/160 |
| 4,818,075 | 4/1989 | Takao et al. | 349/106 |
| 5,121,237 | 7/1992 | Ikeda et al. | 349/110 |
| 5,327,001 | 7/1995 | Wakai et al. | 349/110 |
| 5,446,562 | 8/1995 | Sato | 349/110 |
| 5,510,916 | 4/1996 | Takahashi | 349/110 |
| 5,585,951 | 12/1996 | Noda et al. | 349/42 |
| 5,631,753 | 5/1997 | Hamaguchi et al. | 349/110 |
| 5,818,550 | 10/1998 | Kadota et al. | 349/106 |

*Primary Examiner*—William L. Sikes
*Assistant Examiner*—Kari M. Horney
*Attorney, Agent, or Firm*—Frishauf, Holtz, Goodman, Langer & Chick, P.C.

[57] ABSTRACT

The periphery of a color filter element formed on a transparent glass substrate and the periphery of a pixel electrode formed on the color filter element are made to overlap with gate lines and drain lines. Black matrices are formed between adjacent color filter elements, on neighboring color filter elements, and on pixel electrodes. In this case, the opening of the black matrix slightly encroaches upon the gate lines and the drain lines. As a result, the area surrounded by the gate lines and the drain lines minus the area for forming a thin film transistor therein is made wide. Accordingly, the opening factor of a liquid crystal display device is made large.

21 Claims, 8 Drawing Sheets

LIQUID CRYSTAL DISPLAY DEVICE WITH LIGHT SHIELD AND COLOR FILTER OVERLAPPING TWO EDGES OF PIXEL ELECTRODE

BACKGROUND OF THE INVENTION

The present invention relates to an active matrix panel having a light shield film around pixel electrodes, which is applied to liquid crystal display devices of active matrix type and the like.

Figure 10:
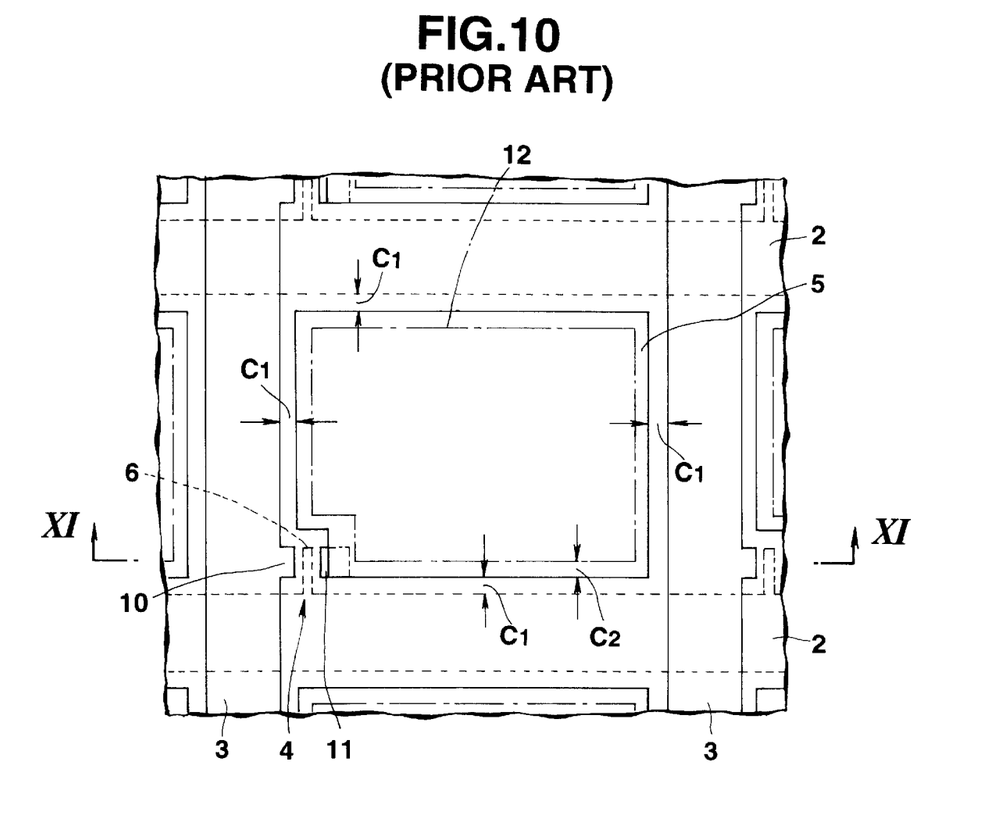
FIG. 10 is an enlarged top view of a part of a conventional active matrix panel.
Figure 11:
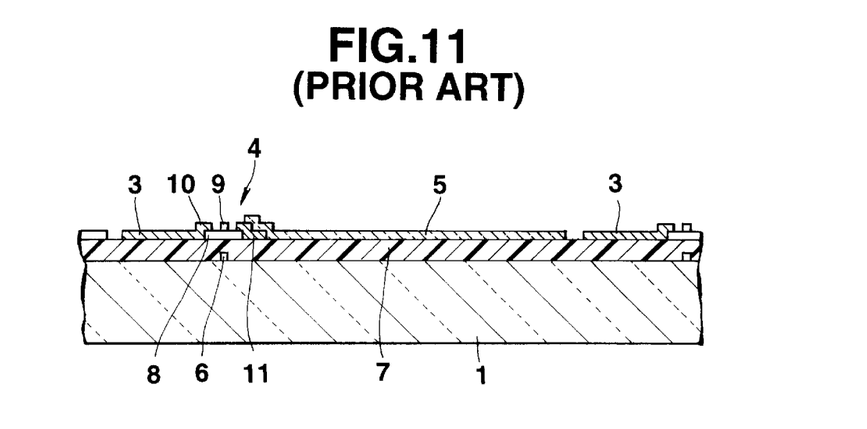
FIG. 11 is a sectional view taken along a line XI—XI of FIG. 10.

FIGS. 10 and 11 show a part of an active matrix panel which has been applied to a conventional liquid crystal display device of active matrix type. FIG. 10 is a top view with a semiconductor thin film 8 and a channel protection film 9 shown in FIG. 11 omitted. This active matrix panel has such a structure that gate lines (scanning lines) 2 and drain lines (signal lines) 3 are disposed in a matrix form, and a thin film transistor 4 and a pixel electrode 5 are disposed near each intersection.

In predetermined locations of the top surface of a glass substrate 1, gate lines 2 including gate electrodes 6 are formed. Over the entire top surface thereof, a gate insulating film 7 is formed. In predetermined locations of the top surface of the gate insulating film 7, semiconductor thin films 8 made of amorphous silicon, poly-silicon, or the like are formed. In the central part of the top surface of each semiconductor thin film 8, a channel protection film 9 is formed. On both sides of the top surface of each semiconductor thin film 8, a drain electrode 10 and a source electrode 11 are formed. Simultaneously with the forming of the electrodes 10 and 11, drain lines 3 are formed. In each of predetermined locations of the top surface of the gate insulating film 7, a pixel electrode 5 made of ITO is formed so as to be electrically connected to one of the source electrodes 11. In FIG. 10, a chain line represents an opening 12 of a black matrix formed in a common electrode panel (not illustrated) having a common electrode (not illustrated). The common electrode panel and an active matrix panel are stuck together at their peripheries by a seal member inserted therebetween. A space between the common electrode panel and the active matrix panel is filled with a liquid crystal material. Corresponding to a voltage applied between the pixel electrode and the common electrode, the light transmission factor of the liquid crystal material changes to conduct a display. In the case of a color liquid crystal display device, color filter elements are arranged in the opening 12 of the common electrode panel.

In such a conventional active matrix panel, a clearance $C_1$ of some degree is formed between the gate line 2 and the pixel electrode 5 and between the drain line 3 and the pixel electrode 5 in order to prevent the voltage to be applied to the pixel electrode at the time of driving from being largely affected by the gate signal and drain signal (partly in order to reduce the parasitic capacitance generated between the gate line 2 and the pixel electrode 5 and between the drain line 3 and the pixel electrode 5) and in order to prevent a short circuit between the drain line 3 and the pixel electrode 5. This clearance $C_1$ is an area having no pixel electrodes 5. Since the clearance $C_1$ always transmits (or intercepts) light, it must be covered by a light shield film. Furthermore, in order to prevent the characteristics of the thin film transistor 4 from being changed by exposure to external light, it is necessary to intercept light for the area corresponding to the thin film transistor 4 as well.

As shown in FIG. 10, therefore, the light shield film has a pattern in which the openings 12 are arranged in a matrix form. In general, the light shield film is called black matrix.

In the case where the clearance $C_1$ and the thin film transistor 4 are to be covered with the light shield film, a clearance $C_2$ of some degree is provided between edges of the opening 12 and the pixel electrode 5 of the black matrix in due consideration of misalignment caused when the active matrix panel and the common electrode panel are stuck together. Therefore, the size of the opening 12 of the black matrix must be made smaller than the size of the area surrounded by the gate lines 2 and the drain lines 3 by at least the sum value of the clearances $C_1$ and $C_2$. This results in a problem of reduced opening factor. The misalignment in sticking together the active matrix panel and the common electrode panel is typically 5 to 6 $\mu$m. Therefore, the opening factor of liquid crystal display devices is nothing but approximately 50%.

BRIEF SUMMARY OF THE INVENTION

A first object of the present invention is to provide an active matrix panel having a black mask, capable of significantly increasing the opening factor of a liquid crystal display device.

A second object of the present invention is to provide an active matrix panel having a black mask, which is excellent in display characteristics and which can be produced efficiently.

In accordance with the present invention, an active matrix panel includes a substrate having a surface, a first scanning line formed on the surface side of the substrate, a second scanning line formed on the surface side of the substrate so as to be parallel to the first scanning line, a first signal line formed on the surface side of the substrate so as to be perpendicular to the first and second scanning lines, a second signal line formed on the surface side of the substrate so as to be parallel to the first signal line, a pixel electrode formed in an area surrounded by the first and second scanning lines and the first and second signal lines, a switching element connected to the pixel electrode, one of the first and second scanning lines, and one of the first and second signal lines, and a light shield film, the light shield film including a portion corresponding to the switching element, the portion being laid on the switching element, a first portion formed so as to overlap with the first scanning line and so as to be narrower in width than the first scanning line, a second portion formed so as to overlap with the second scanning line and so as to be narrower in width than the second scanning line, a third portion formed so as to overlap with the first signal line and so as to be narrower in width than the first signal line, and a fourth portion formed so as to overlap with the second signal line and so as to be narrower in width than the second signal line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

Figure 1:
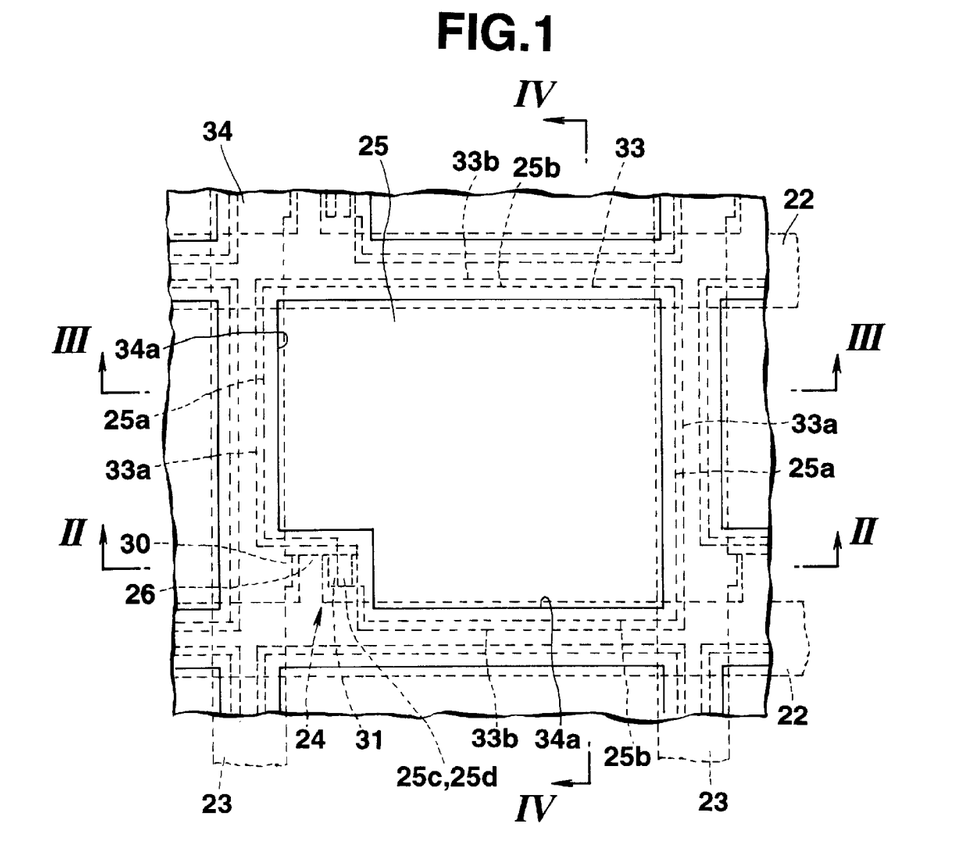
FIG. 1 is an enlarged top view showing a part of an active matrix panel according to a first embodiment of the present invention.
Figure 2:
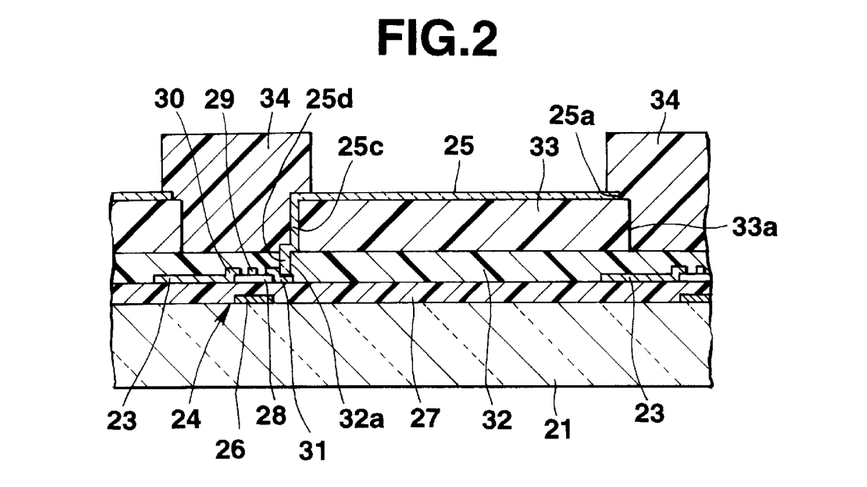
FIG. 2 is a sectional view taken along a line II—II of FIG. 1.
Figure 3:
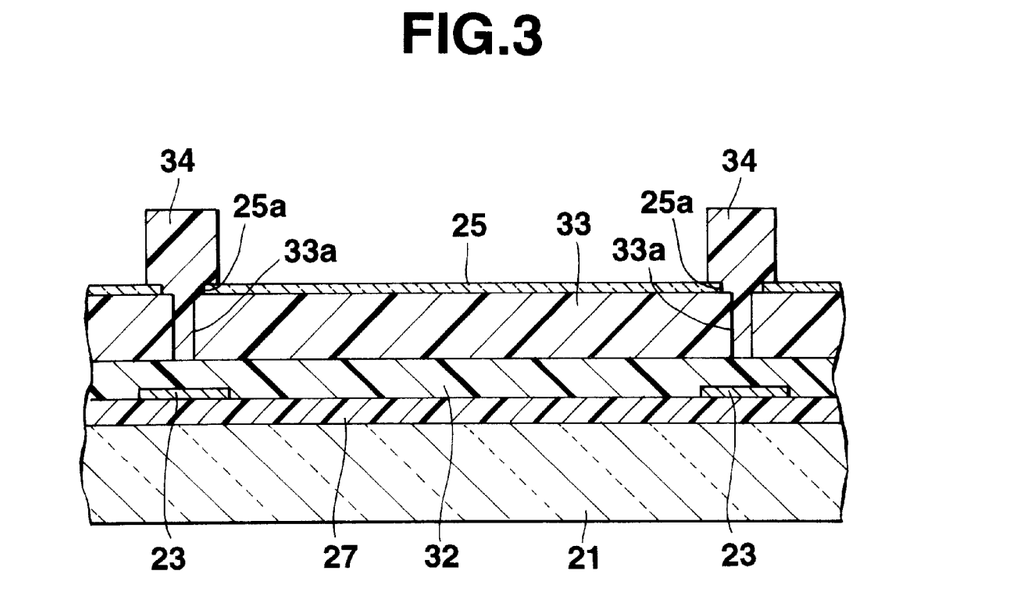
FIG. 3 is a sectional view taken along a line III—III of FIG. 1.
Figure 4:
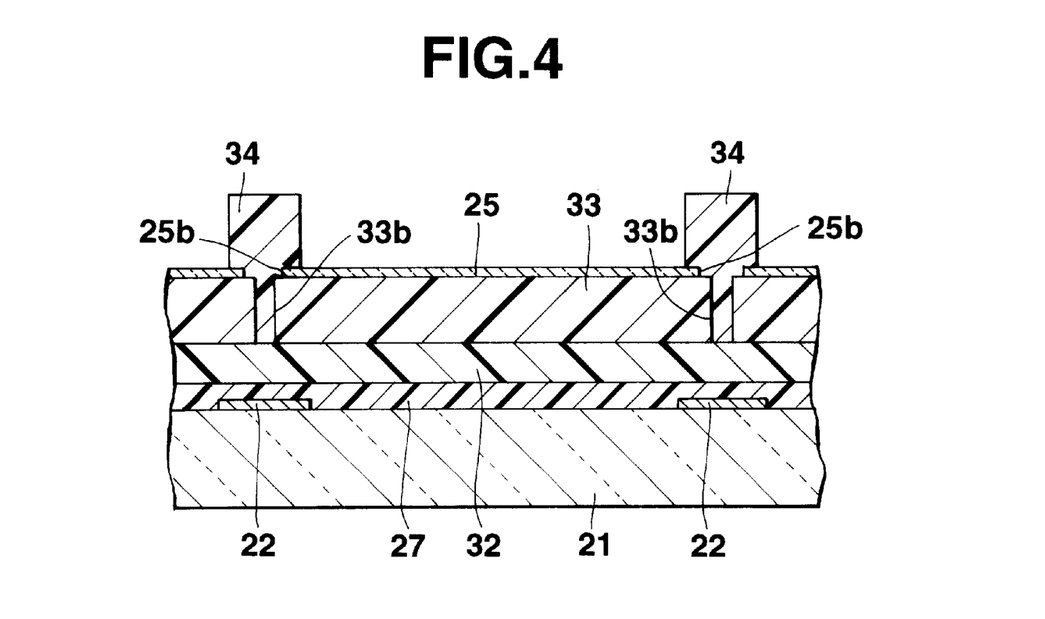
FIG. 4 is a sectional view taken along a line IV—IV of FIG. 1.

FIG. 1 is an enlarge top view of an active matrix panel having a light shield film, showing a first embodiment of the present invention. FIG. 2 is a sectional view taken along a line II—II of FIG. 1. FIG. 3 is a sectional view taken along a line III—III of FIG. 1. FIG. 4 is a sectional view taken along a line IV—IV of FIG. 1.

This active matrix panel has a transparent glass substrate 21. On the glass substrate 21, gate lines (scanning lines) 22 and drain lines (signal lines) 23 are formed in a matrix form. In the vicinity of each intersection of them, a thin film transistor 24 and a pixel electrode 25 are formed.

Specifically, in predetermined locations of the top surface of the glass substrate 21, gate lines 22 including gate electrodes 26 are formed. On the substrate including the entire top surface thereof, a gate insulating film 27 is formed. In predetermined locations of the top surface of the gate insulating film 27, semiconductor thin films 28 made of amorphous silicon, poly-silicon, or the like are formed. In the central part of the top surface of each semiconductor thin film 28, a channel protection film 29 is formed. On both sides of the top surface of each semiconductor thin film 28, a drain electrode 30 and a source electrode 31 are formed. Simultaneously with the forming of the electrodes 30 and 31, drain lines 23 are formed. On the gate insulating film 27 including the entire top surface thereof, an overcoat insulating film 32 is formed.

In predetermined locations of the top surface of the overcoat insulating film 32, color filter elements 33 are formed.

Each color filter element 33 exhibits a color of R (red), G(green) or B(blue). For example, by employing a distribution method using a color resist containing paints of respective pigments, each color filter element is formed so as to have a film thickness of approximately 1 to 3 μm. As shown in FIGS. 1 and 3, left and right edges 33a of each color filter element 33 extend over the drain lines 23. In other words, each of the left and right end portions of the filter element is laid over top of a part of a drain line. As shown in FIGS. 1 and 4, top and bottom edges 33b of each color filter element 33 shown in FIG. 1 extend over the gate lines 22. In other words, each of the top and bottom end portions of the filter element is laid over top of a part of a gate line. As shown in FIGS. 1 and 2, any color filter elements 33 are not formed in areas corresponding to the thin film transistors 24 (they do not overlap in panel thickness direction).

On the top of each color filter element 33, a pixel electrode 25 having a size slightly smaller than the top of each color filter element 33 and made of ITO is formed as shown in FIGS. 1 to 4. In this case, left and right edges 25a of the pixel electrode 25 are laid over the drain lines 23 as shown in FIGS. 1 and 3 as well. As shown in FIGS. 1 and 4 as well, top and bottom edges 25b of each pixel electrode 25 shown in FIG. 1 are laid over the gate lines 22. As shown in FIGS. 1 and 2, each pixel electrode 25 extends from a part thereof, and is electrically connected to the source electrode 31 via a connection portion 25c formed on the side surface of the color filter element 33 and a connection portion 25d formed in a contact hole 32a which is formed in the overcoat insulating film 32.

A black matrix 34 will now be described. Black matrix 34 is formed between adjacent color filter elements 33, on edges 33a and 33b of neighboring color filter elements 33, and on edges 25a and 25b of pixel electrodes 25. In this case, the maximum width of a strip-shaped portion of the black matrix 34 formed over the drain line 23 is made slightly narrower than the width of the drain line 23 as shown in FIGS. 1 and 3. The strip-shaped portion of the black matrix 34 is formed over the central part of the drain line 23 in the width direction. In other words, the strip-shaped portion of the black matrix 34 is formed so that its overall width will be laid over the drain line 23. Furthermore, as shown in FIGS. 1 and 4, the maximum width of a strip-shaped portion of the black matrix 34 formed over a gate line 22 is made slightly narrower than the width of the gate line 22. The strip-shaped portion of the black matrix 34 is formed over the central part of the gate line 22 in the width direction. In other words, the strip-shaped portion of the black matrix 34 is formed so that its overall width will be laid over the gate line 22. Furthermore, as shown in FIGS. 1 and 2, the black matrix 34 is formed so as to cover a part of the thin film transistor 24.

In this active matrix panel, therefore, an opening portion 34a of the black matrix 34 (i.e., a space surrounded by the strip-shaped portions over the drain lines 23, the strip-shaped portions over the gate lines 22, and the portion over the transistor 24) slightly encroaches upon the gate lines 22 and the drain lines 23 in a direction along the plane of the panel in a plane view especially as shown in FIG. 1. In addition, in the opening 34a of the black matrix 34, the pixel electrode 25 and the color filter element 33 are disposed without any clearance with the gate lines 22 and the drain lines 23. As a result, in the case where the gate lines 22 and the drain lines 23 are formed by an opaque material such as chromium or aluminum, all of the area surrounded by the gate lines 22 and the drain lines 23 excepting the area for forming the thin film transistor 24 therein becomes a pixel area surrounded by light shuld substance. This means the opening factor is enlarged. Furthermore, in the case where the gate lines 22 and the drain lines 23 are formed by a transparent material such as ITO, the opening portion 34a of the black matrix 34 becomes the pixel area. Therefore, the opening factor can be made much larger.

The black matrix 34 is formed by using, for example, resin black having a black paint or carbon distributed in a resin such as an acrylic resin. In the case of a black paint, the insulation property is high. Even if the black matrix is formed over the thin film transistor 24, therefore, an electric bad influence is not caused, resulting in an advantage. Since the black paint is low in light shield property, however, the film thickness of the black mask must be large. This hampers a high degree of the flatness of the orientation film for orientating the liquid crystal. As a result, the display quality is lowered. On the other hand, in the case of the resin black having distributed carbon, the light shield factor is high, and consequently the film thickness of the black mask can be made thin and the display quality can be improved. However, the resin black having distributed carbon has high conductivity. This results in a problem that electric coupling with the drain line 23, the gate line 22 and the thin film transistor 24 is apt to occur.

In this active matrix panel of the present invention, the overcoat insulating film 32 and the color filter element 33 lie between each pixel electrode 25 and the drain lines 23, between the pixel electrode 25 and the gate lines 22, and between the pixel electrode 25 and the thin film transistor 24 as shown in FIGS. 2 through 4. Even if the resin black having distributed carbon, therefore, electric coupling between the pixel electrode 25 and the signal line or the thin film transistor is prevented, and a favorable display quality can be obtained. In addition, short circuits between the pixel electrode 25 and the gate lines 22, and between the pixel electrode 25 and the drain lines 23 can also be prevented certainly.

An example of a method for manufacturing a part of this active matrix panel will be described briefly. The overcoat insulating film 32 is formed so as to cover the thin film transistor 24. Thereafter, the color filter element 33 is formed on top of the overcoat insulating film 32. Subsequently, the contact hole 32a is formed in the overcoat insulating film 32. Subsequently, the pixel electrode 25 is formed on top of the color filter element 33. On the side surface of the color filter element 32, the connection portion 25c is formed. In addition, the connection portion 25d is formed in the contact hole 32a of the overcoat insulating film 32. Subsequently, the black matrix 34 is formed.

Figure 5:
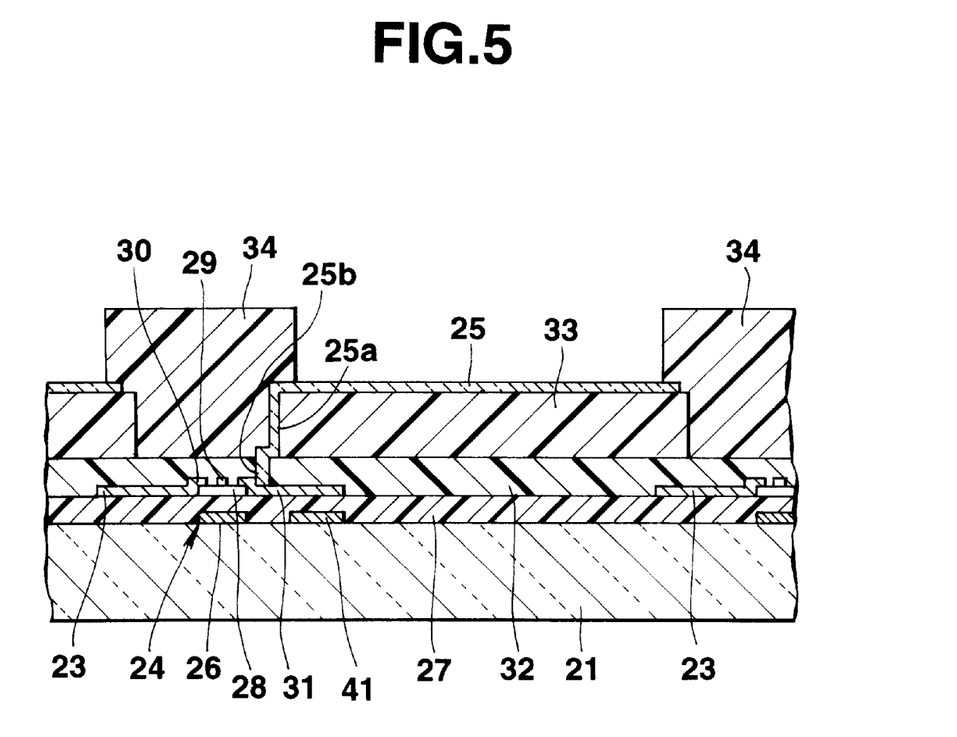
FIG. 5 is a sectional view showing a modification of the active matrix pannel shown in FIG. 2.

FIG. 5 shows a modification of the first embodiment.

This modification differs from FIG. 2 in having an auxiliary capacitance electrode 41. In other words, when the gate lines 22 and the gate electrode 26 are formed in the case of FIG. 5, the auxiliary capacitance electrode 41 is formed at the same time. The auxiliary capacitance electrode 41 is opposed to the source electrode 31. Typically, the auxiliary capacitance electrode is formed on a surface having a gate electrode formed thereon, so as to be opposed to the pixel electrode. In the structure shown in FIG. 2, however, the gate insulating film 27, the overcoat insulating film 32, and the color filter element 33 lie between the gate electrode 26 and the pixel electrode 25. Therefore, the distance between an auxiliary capacitance electrode formed on top of the glass substrate 21 and the pixel electrode 25 becomes too long, resulting in a small auxiliary capacitance value. As a result, the area of the auxiliary capacitance electrode becomes large, and the opening factor is reduced.

In the active matrix panel shown in FIG. 5, however, the auxiliary capacitance electrode 41 is formed on the top of the glass substrate 21, and the source electrode 31 is formed so as to be laid over the auxiliary capacitance electrode 41 via only the gate insulating film 27. The source electrode 31 serves as a pixel electrode for forming an auxiliary capacitance portion. A sufficient capacitance value can be obtained with a small area. Other structures shown in FIG. 5 are the same as the structures denoted by the corresponding reference numerals of FIG. 2.

Figure 6:
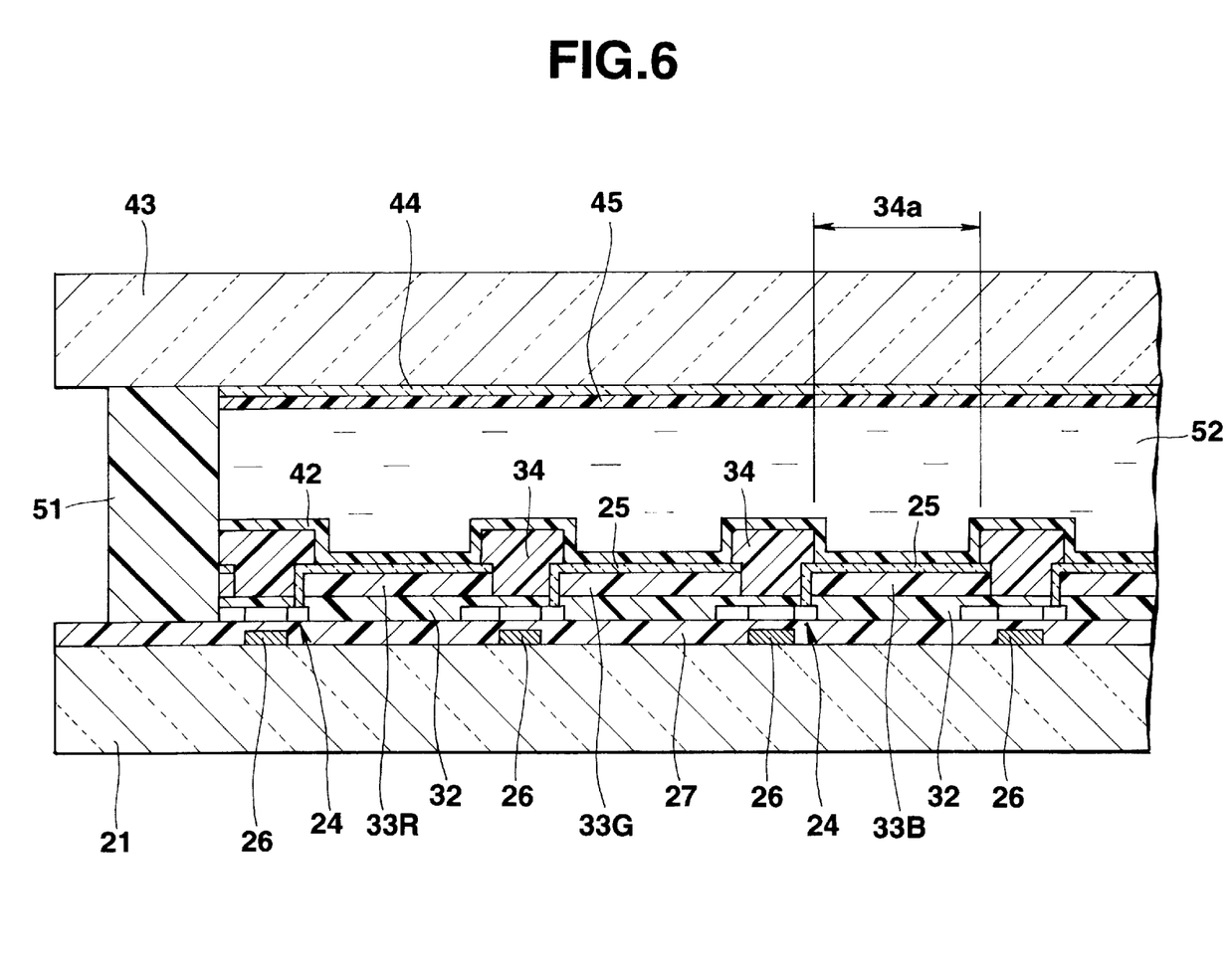
FIG. 6 is an enlarged sectional view of a liquid crystal display device having an active matrix panel of the first embodiment.

FIG. 6 is a sectional view of a color liquid crystal display device using the active matrix panel of the first embodiment.

In FIG. 6, the thin film transistor 24 is schematically shown. Details of the thin film transistor 24 are the same as those shown in FIG. 2. As color filter elements, red filter elements 33R, green filter elements 33G, and blue filter elements 33B are repeatedly disposed one after another. On the black matrix 34 and the pixel electrode 25, an aligning film 42 is formed.

On the other hand, a common electrode 44 made of ITO is formed in a display area of an upper glass substrate 43, and an aligning film 45 is formed beneath the common electrode 44. The lower glass substrate 21 and the upper glass substrate 43 are stuck together via a seal member 51 formed in a non-display area of a predetermined surface of either of the glass substrates by printing. A space between the aligning films 42 and 45 on the glass substrates 21 and 43 in the inside of the frame-like seal member 51 is filled with a liquid crystal material 52.

In this color liquid crystal display device, the color filter elements 33R, 33G and 33B are formed on the lower glass substrate 21. Between the color filter elements 33R, 33G and 33B, the black matrix 34 is formed so as to overlap with edges of the color filter elements 33R, 33G and 33B. Irrespective of the misalignment caused when the glass substrates 21 and 43 are stuck together via the seal member 51, therefore, it is possible to set the positional relation between the pixel electrodes 25 and the openings 34a of the black matrix 34. As a result, the openings 34a of the black matrix 34 can be made large as far as possible. In its turn, the opening factor can be made large.

Second Embodiment

Figure 7:
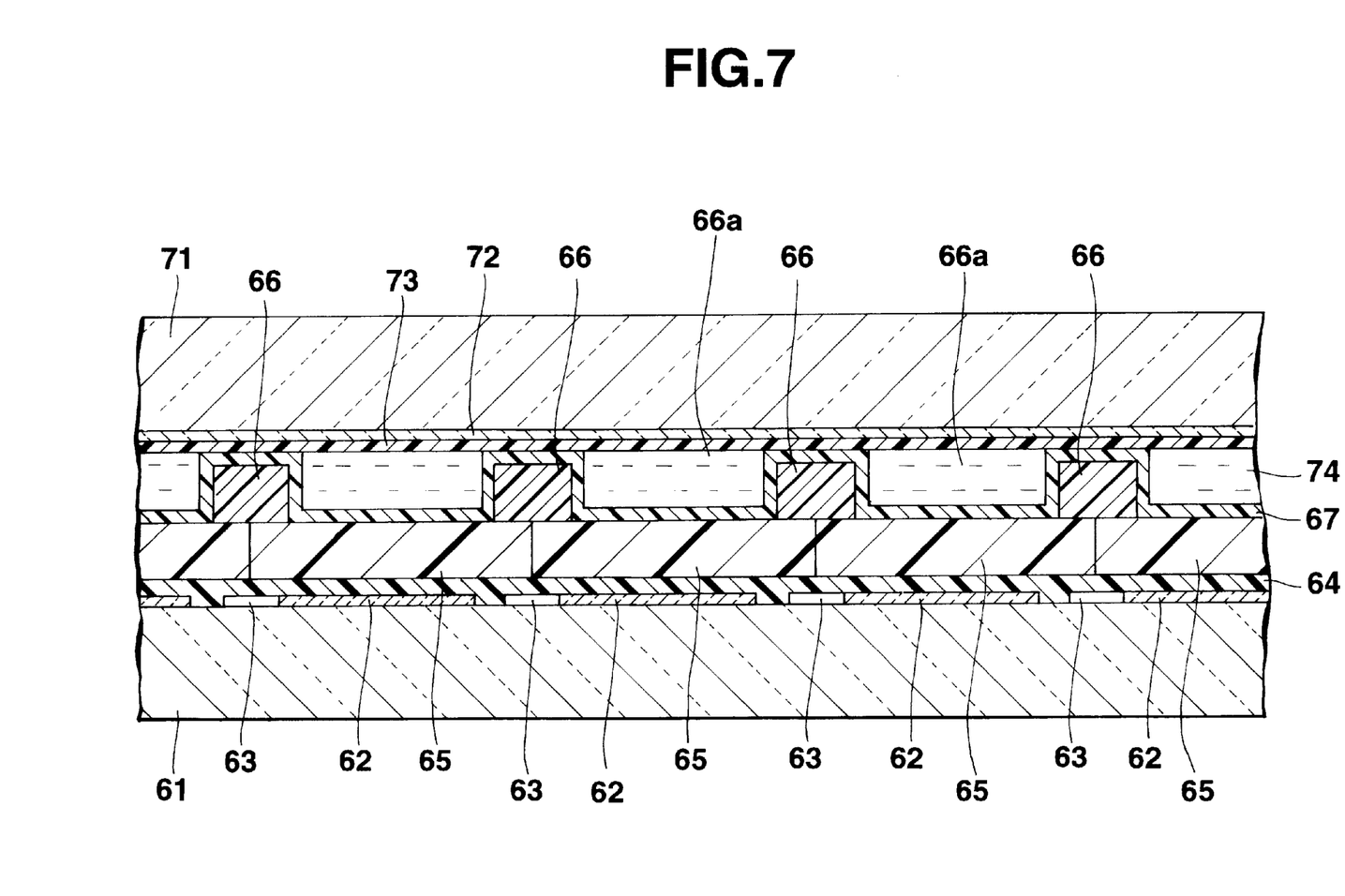
FIG. 7 is an enlarged sectional view of a liquid crystal display device having an active matrix panel of a second embodiment of the present invention.

FIG. 7 is an enlarged sectional view of a second embodiment according to the present invention. The liquid crystal display device has a lower transparent substrate 61 and an upper transparent substrate 71 which are made of glass, a resin, or the like. On a top surface of the lower transparent substrate 61, pixel electrodes 62 made of ITO and thin film transistors 63 serving as switching elements are formed in a matrix form. On a top surface thereof, an overcoat insulating film 64 is formed.

On a top surface of the overcoat insulating film 64, red, green and blue color filter elements 65 are formed so as to be adjacent to each other. In this case, the color filter elements 65 are formed to have a film thickness of approximately 1 to 3 $\mu$m by a distribution method using color resists containing paints of respective colors. However, the color filter elements 65 may be formed by using a single layer dyeing method. On parts of the top surface of the color filter elements 65 corresponding to the thin film transistors 63, light shield films 66 are formed in a stripe form in the same way as the first embodiment or in such a dot form that stripes are cut by grooves at predetermined intervals. In the case of the dot form, the light shield films are separated from each other and formed by a large number of island areas. In the light shield films 66, opening portions 66a corresponding to respective pixel electrodes are arranged in a matrix form as shown in the first embodiment. The light shield films 66 are formed to have such a film thickness that the cell gap described later becomes approximately 1.5 to 2 μm, by using resin black obtained by distributing a black paint or carbon in a resin such as an acrylic resin. The resin black having a distributed black paint is lower in light shield factor than the resin black having distributed carbon. For making the cell gap small and obtaining a sufficient light shield factor, the resin black having distributed carbon is more desirable. On top surfaces of the light shield films 66 and the color filter elements 65, an orientation film 67 is formed.

On the other hand, on the bottom surface of the upper transparent substrate 71, a common electrode 72 is formed. On the bottom surface of the common electrode 72, an aligning film 73 is formed. The lower transparent substrate 61 and the upper transparent substrate 71 are stuck together via a seal member which is not illustrated. Between the aligning films 67 and 73 on the transparent substrates 61 and 71 in the inside of the seal material, a liquid crystal material 74 is filled. In this case, the top surface of the part of the aligning film 67 formed on the light shield film 66 is brought into contact with the bottom surface of the aligning film 73 formed beneath the upper transparent substrate 71. As a result, the space between the aligning films 67 and 73 respectively of the transparent substrates 61 and 71, i.e., the cell gap becomes the film thickness (height) of the light shield film 66. In other words, the light shield films 66 arranged in a dot form constitute pillar-shaped spacers.

In this liquid crystal display device, spacers are formed by the light shield films 66 disposed in predetermined locations over the lower transparent substrate 61. Therefore, the spacers can be distributed certainly in predetermined locations. As a result, the number of spacers arranged, for example, per unit area can be made fixed. Therefore, the distribution density of the spacers can be made uniform certainly. Furthermore, it is made possible that the spacers do not move even if the spacers are subjected to external force. As a result of the facts heretofore described, the display characteristics of the liquid crystal can be made uniform. Furthermore, since the pillar-shaped spacers are formed by the light shield films 66, the spacers themselves do not shine whitely and the orientation of molecules of the liquid crystal material 74 are not disturbed near the spacers. Therefore, the contrast can be improved.

The cell gap will now be described. For example, in liquid crystal display devices using ferroelectric liquid crystal materials or antiferroelectric liquid crystal materials as the liquid crystal material 74, the cell gap is set equal to approximately 1.5 to 2 μm. If the film thickness of the light shield films 66 forming the spacers as described above is set equal to such a value that the cell gap is in the range of approximately 1.5 to 2 μm, therefore, the cell gap can be set equal to approximately 1.5 to 2 μm.

As a matter of course, the spacers including the light shield films 66 for shielding the thin film transistor 63 from light can be formed by forming the light shield films 66. Therefore, the number of manufacturing processes can be prevented from increasing. In addition, since it is not necessary to scatter spacers unlike the conventional technique, the number of manufacturing processes can be decreased by that amount, on the contrary. In this case, for making the cell gap small and making the light shield performance sufficient, the resin black having distributed carbon is desired. However, the resin black having distributed carbon has a high conductivity value. If the resin black having distributed carbon is located near the thin film transistor or wiring such as a signal line, therefore, it causes an increase in capacitance by a leak current or coupling. In such a configuration that the thin film transistor and the overall wiring are covered by the color filter element and the resin black is formed on the color filter element as in the present embodiment, however, a sufficient distance between the thin film transistor or wiring and the light shield film can be assured. Even if the resin black having distributed carbon is used, therefore, the above described bad effect can be prevented.

Third Embodiment

Figure 8:
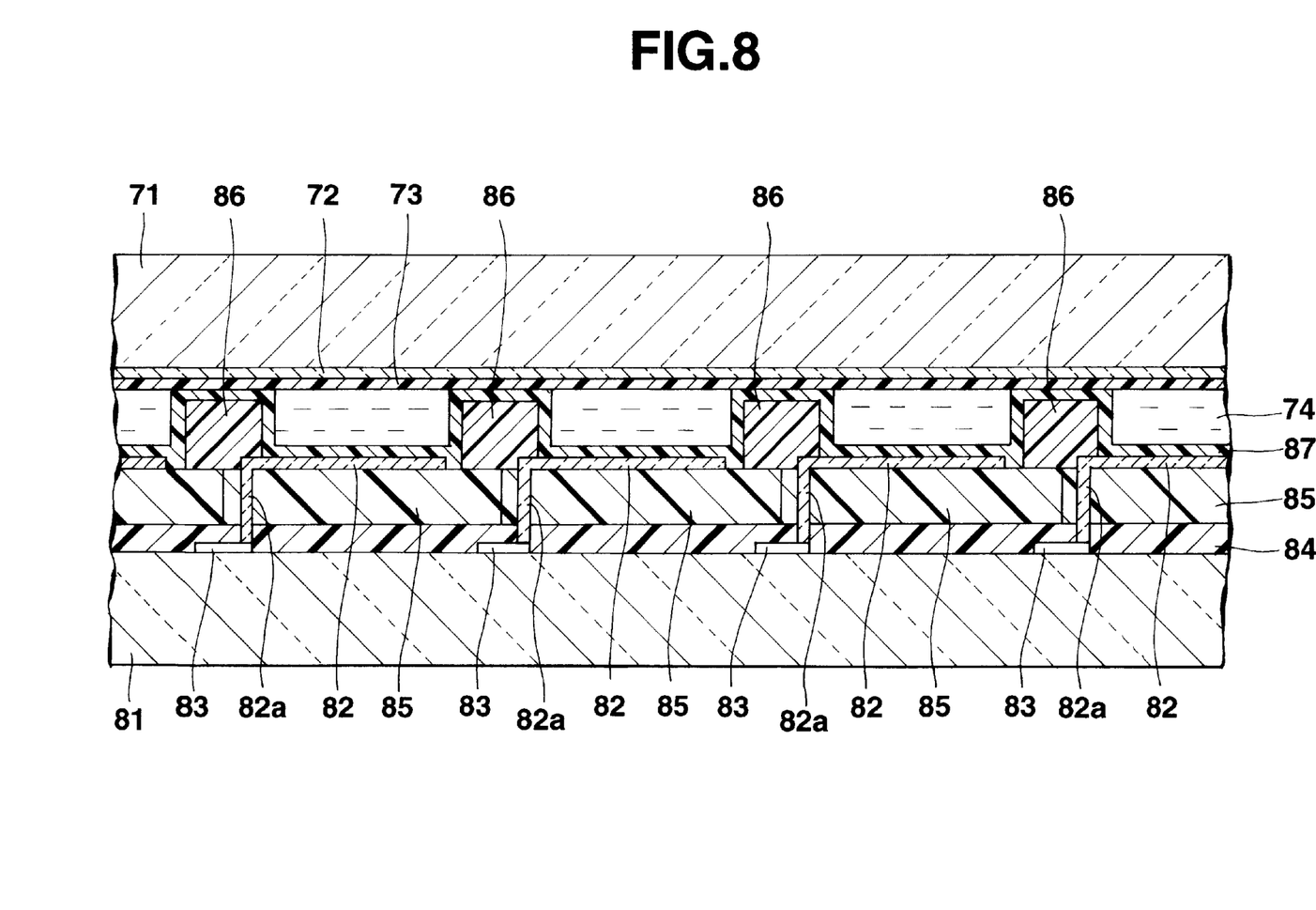
FIG. 8 is an enlarged sectional view of a liquid crystal display device having an active matrix panel of a third embodiment of the present invention.

FIG. 8 shows a third embodiment of the present invention. On a top surface of a lower transparent substrate 81, thin film transistors 83 are formed. On the top surface of the substrate including the top surfaces of the transistors, an overcoat insulating film 84 is formed. On a top surface of the overcoat insulating film 84, color filter elements 85 are formed. On top surfaces of the color filter elements 85, pixel electrodes 82 and light shield films 86 are formed. On top surfaces of the pixel electrodes 82 and the light shield films 86, an aligning film 87 is formed. In this case, each pixel electrode 82 is connected to a source electrode of a thin film transistor 83 via a connection portion 82a formed in a contact hole which is in turn formed in a color filter element 85 and the overcoat insulating film 84. The remaining configuration of FIG. 8 is the same as the configuration shown in FIG. 7.

Fourth Embodiment

Figure 9:
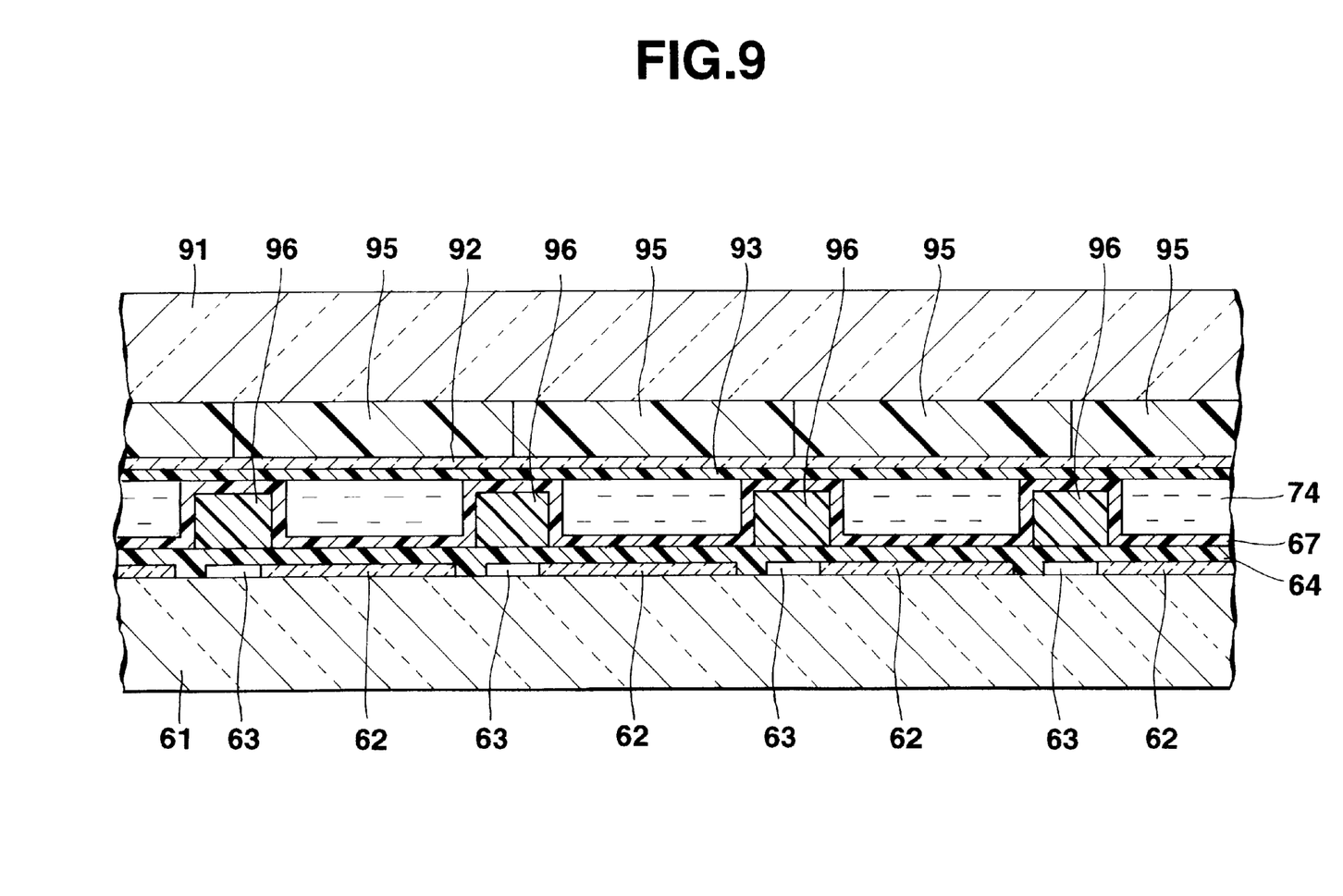
FIG. 9 is an enlarged sectional view of a liquid crystal display device having an active matrix panel of a fourth embodiment of the present invention.

FIG. 9 shows a fourth embodiment of the present invention. In this embodiment, color filter elements 95 are formed beneath a bottom surface of a upper transparent substrate 91. Beneath the bottom surfaces of the color filter elements 95, a common electrode 92 is formed. Beneath the bottom surface of the common electrode 92, an aligning film 93 is formed. Therefore, color filter elements are not formed on a lower transparent substrate 61. The remaining configuration of FIG. 9 is the same as the configuration shown in FIG. 7. The same members are denoted by like reference numerals, and description thereof are omitted.

In the above described second through fourth embodiments, the light shield films 66, 86 or 96 may be formed on the side of the upper transparent substrates instead of the lower transparent substrates 61 or 81. The light shield films 66, 86 or 96 may be formed on both the side of the lower transparent substrate 61 or 81 and the side of the upper transparent substrate 71 or 91.

Furthermore, instead of being formed in a dot form on thin film transistors, the light shield films 66, 86, or 96 may be formed in a dot form or in a line form on scanning lines for supplying scanning signals or on signal lines for supplying data signals to the thin film transistors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A liquid crystal display device comprising:
   first and second substrates;
   a liquid crystal material disposed between said first and second substrates;
   a pixel electrode having a first edge, a second edge opposed to said first edge, a third edge perpendicular to said first and second edges, and a fourth edge opposed to said third edge;

a switching element having first, second and third terminals, said third terminal being connected to said pixel electrode;

a first scanning line formed in parallel to said first edge of said pixel electrode and connected to said first terminal of said switching element;

a second scanning line formed in parallel to said second edge of said pixel electrode;

a first signal line formed in parallel to said third edge of said pixel electrode and connected to said second terminal of said switching element;

a second signal line formed in parallel to said third edge of said pixel electrode;

a light shield film, said light shield film comprising a portion corresponding to the switching element, said portion being laid on said switching element, a first portion formed so as to overlap with said first scanning line and so as to be narrower in width than said first scanning line, a second portion formed so as to overlap with said second scanning line and so as to be narrower in width than said second scanning line, a third portion formed so as to overlap with said first signal line, and a fourth portion formed so as to overlap with said second signal line; and a color filter element opposed to said pixel electrode, said color filter element overlapping with said first and second edges of said pixel electrode.

2. A liquid crystal display device according to claim 1, wherein said light shield film is formed by resin black containing carbon.

3. A liquid crystal display device according to claim 1, wherein said light shield film is formed on said first substrate, and said light shield film is in contact with said second substrate.

4. A liquid crystal display device according to claim 1, wherein said light shield film is formed on said color filter element.

5. A liquid crystal display device according to claim 1, further comprising an insulating film covering said switching element and extending over one of said first and second substrates.

6. A liquid crystal display device according to claim 5, wherein said light shield film is formed on said insulating film.

7. A liquid crystal display device according to claim 5, wherein said color filter element is formed on said insulating film.

8. A liquid crystal display device according to claim 5, wherein said light shield film and said color filter element are formed on said insulating film.

9. A liquid crystal display device according to claim 8, wherein said pixel electrode is formed on said color filter element.

10. A liquid crystal display device according to claim 8, wherein said light shield film is projected from said color filter element.

11. A liquid crystal display device comprising:

first and second substrates;

a liquid crystal material disposed between said first and second substrates;

a pixel electrode having a first edge, a second edge opposed to said first edge, a third edge perpendicular to said first and second edges, and a fourth edge opposed to said third edge;

a switching element having first, second and third terminals, said third terminal being connected to said pixel electrode;

a first scanning line formed in parallel to said first edge of said pixel electrode and connected to said first terminal of said switching element;

a second scanning line formed in parallel to said second edge of said pixel electrode;

a first signal line formed in parallel to said third edge of said pixel electrode and connected to said second terminal of said switching element;

a second signal line formed in parallel to said third edge of said pixel electrode;

a light shield film, said light shield film comprising a portion corresponding to the switching element, said portion being laid on said switching element, a first portion formed so as to overlap with said first scanning line, a second portion formed so as to overlap with said second scanning line, a third portion formed so as to overlap with said first signal line and so as to be narrower in width than said first signal line, and a fourth portion formed so as to overlap with said second signal line and so as to be narrower in width than said second signal line; and a color filter element opposed to said pixel electrode, said color filter element overlapping with said third and fourth edges of said pixel electrode.

12. A liquid crystal display device according to claim 11, wherein said light shield film is formed by resin black containing carbon.

13. A liquid crystal display device according to claim 11, wherein said light shield film is formed on said first substrate, and said light shield film is in contact with said second substrate.

14. A liquid crystal display device according to claim 11, wherein said light shield film is formed on said color filter element.

15. A liquid crystal display device according to claim 11, wherein said first portion and said second portion of said light shield film are narrower in width than said first scanning line and said second scanning line, respectively.

16. A liquid crystal display device according to claim 11, further comprising an insulating film covering said switching element and extending over one of said first and second substrates.

17. A liquid crystal display device according to claim 16, wherein said light shield film is formed on said insulating film.

18. A liquid crystal display device according to claim 16, wherein said color filter element is formed on said insulating film.

19. A liquid crystal display device according to claim 16, wherein said light shield film and said color filter element are formed on said insulating film.

20. A liquid crystal display device according to claim 19, wherein said pixel electrode is formed on said color filter element.

21. A liquid crystal display device according to claim 19, wherein said light shield film is projected from said color filter element.

* * * * *